United States Patent [19]

Van Gheluwe et al.

[11] Patent Number: 4,473,668

[45] Date of Patent: Sep. 25, 1984

[54] METHOD FOR DETERMINING THE OPTIMUM COMPONENT RATIOS IN A POLYURETHANE FOAM PROCESS

[75] Inventors: Patrick Van Gheluwe, Montreal; Robert Laniel, Repentigny; Jacques Leroux, Montreal, all of Canada

[73] Assignees: Union Carbide Canada Ltd.; National Research Council Canada, both of Toronto, Canada

[21] Appl. No.: 492,760

[22] Filed: May 9, 1983

[30] Foreign Application Priority Data

Apr. 29, 1983 [CA] Canada .................................. 427063

[51] Int. Cl.³ ............................................. C08J 9/14
[52] U.S. Cl. .................................... 521/131; 521/155; 526/61
[58] Field of Search ................... 521/131, 155; 526/61

[56] References Cited

U.S. PATENT DOCUMENTS 4,288,230 9/1981 Ebeling et al. ..................... 521/155

Primary Examiner—Morton Foelak
Attorney, Agent, or Firm—James C. Arvantes; William G. Hopley; Albert E. Koller

[57] ABSTRACT

A method for determining the optimum component ratios in an exothermic process for producing polyurethane foam is described which consists of continuously measuring the temperature differential with respect to time and then determining the optimum component ratios by comparing the maximum value of each of the sequential temperature differential peaks and the times at which they occur.

6 Claims, 1 Drawing Figure

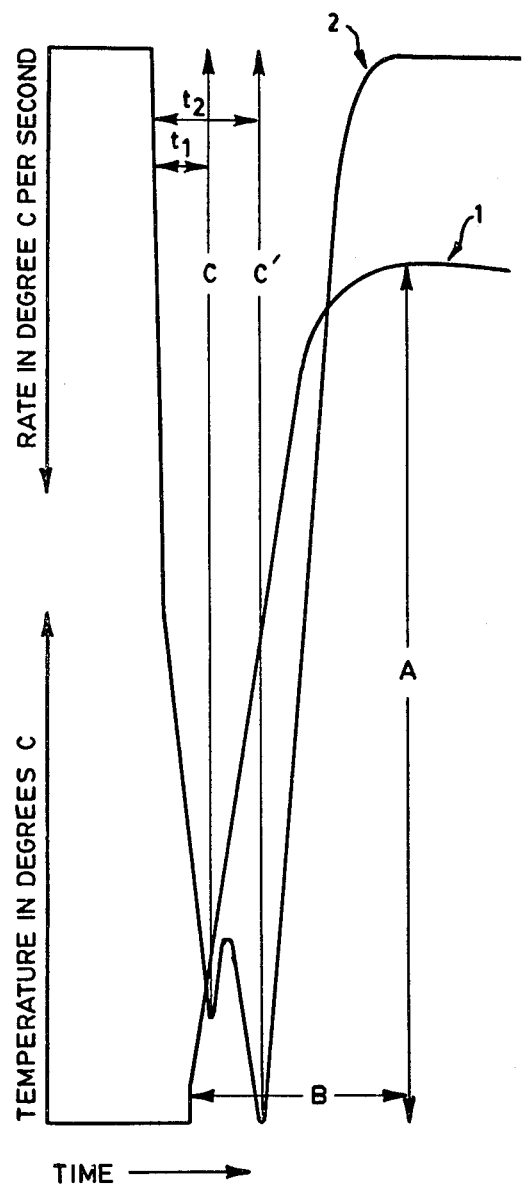

METHOD FOR DETERMINING THE OPTIMUM COMPONENT RATIOS IN A POLYURETHANE FOAM PROCESS

FIELD OF THE INVENTION

This invention relates to a method for determining the optimum component ratios in a process for producing polyurethane foam. More particularly, it relates to a method whereby a record is traced of the reaction temperature (T) versus time (t) as well as the instantaneous temperature differential with respect to time dT/dt versus time (t) in the exothermic process for producing polyurethane foam. By studying the sequential differential peaks obtained and the times at which they occur, observations can be made of the effects of the various components in the reaction.

DESCRIPTION OF THE PRIOR ART

Numerous chemical processes exhibit an exothermic behaviour. A graph representing the rise in reaction temperature versus time defines an exothermic curve over a given period and the degree of exothermic behaviour is shown in the slope of the exothermic curve. These exothermic curves may contain inflection points which reflect the stepwise characteristic of the process. Graphical analysis of these curves often ignore contribution of individual exotherms in the process as sudden changes in the temperature (T) versus time (t) are difficult to observe visually on the graph.

The production of polyurethane foam involves a balance in the timing of two types of reactions. One reaction results in the blowing of the liquid components into a foam while the other reaction gels the mass. The initial reaction is exothermic as a result of the reaction of isocyanate with water and this is responsible for the blowing of the foam by virtue of the carbon dioxide generated. The second exothermic reaction of isocyanate with the polyol forms polyurethane and leads to the gelling of the cellular structure. The urea and urethane groups react further with excess isocyanate and consolidate the structure through crosslink formation. The two exothermic reactions in the process for producing polyurethane foam can be expressed by the formulae:

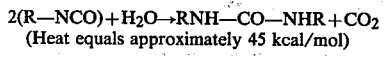
(Heat equals approximately 45 kcal/mol)

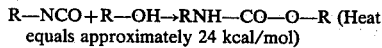 (Heat equals approximately 24 kcal/mol)

It has now been discovered that by using the apparatus described in this application a curve of the temperature differential with respect to time (dT/dt) extrapolated over the overall reaction period can be obtained which clearly shows the dual exothermic characteristic of the process. This is illustrated by sequential peaks in the temperature differential curve in a manner to be described below.

OBJECT OF THE INVENTION

It is therefore an object of the invention to provide a method for determining the optimum component ratios in an exothermic process for producing polyurethane from an evaluation of the sequential temperature differential peaks and the times at which they occur.

It is another object of the invention to determine the temperature of the polyurethane reaction mixture over the total process time, generating a signal corresponding to such temperature and simultaneously effecting a signal by means of a voltage differentiator corresponding to the derivative with respect to time of such signal and then recording the derivative signal to obtain a record of the temperature derivative with respect to time of the polyurethane foam process.

These and other objects are obtained by means of a method for determining the optimum component ratios in an exothermic process for producing polyurethane foam, which method comprises:

(a) continuously measuring the temperature differential with respect to time in the reaction by means of an apparatus consisting of:
  (i) a means capable of generating a voltage signal proportional to the temperature in the reaction mixture,
  (ii) means capable of effecting a signal corresponding to the derivative with respect to time of said voltage,
  (iii) means capable of recording the derivative signal thereby producing a record of the temperature differential with respect to time; and (b) determining the said optimum component ratios by comparing the maximum value of each of the sequential temperature differential peaks recorded from said derivative signal and the times at which they occur.

BRIEF DESCRIPTION OF THE DRAWING

The single FIGURE of drawings illustrates a typical temperature differential with respect to time versus time for an exothermic polyurethane foam process.

DETAILED DESCRIPTION OF THE INVENTION

The apparatus used for measuring and recording the temperature differential with respect to time in a polyurethane foam process consists of a thermocouple connected to a digital thermometer having an internal ice-point compensator. The temperature reading is converted to a voltage signal in a well known manner in terms of mV/°C. and this signal is fed to a differentiating circuit such as a voltage differentiator capable of effecting the temperature differential with respect to time (dT/dt). This differential signal is fed to a standard recorder where the signal is converted to a curve on a chart wherein a graph representing (dT/dt) versus reaction time is produced. The apparatus can be constructed so that both the voltage signal from the digital thermometer and the signal from the voltage differentiator are fed to a two-pen recorder so that a curve representing the exothermic temperature of the entire process and a curve representing the temperature differential with respect to time are both recorded on the same graph having the same X-coordinate representing process time. For purposes of studying the polyurethane foam process for determining the optimum component ratios of this invention however, only the curve representing the temperature differential with respect to time is required.

Although the method of this invention is particularly useful in the study of the exothermic process for producing polyurethane foam it must be appreciated that it could be used in the study of other exothermic processes particularly those that are found to be bi-exothermic like polyurethane foam.

In the present study polyol such as a secondary hydroxyl end-terminated polyether polyol sold under the trade mark NIAX TM 16-46 was weighed at 23±0.5° C. into a two quart paper container together with an amine catalyst such as bis(dimethylamino ethyl) ether in dipropylene glycol (NIAX TM Catalyst A-1 sold by Union Carbide Corporation) and a silicone surfactant. Toluene diisocyanate and the stannous octoate catalyst were weighed separately. A steel frame holding four baffles is inserted in the paper container next to the wall to improve mixing.

The first set of reaction components are mixed by means of a mechanical mixer at about 2400 rpm for one minute then the stannous octoate catalyst is added and mixing resumed after a fifteen second stop. After eight seconds of mixing the toluene diisocyanate is then introduced with mixing over a period of about seven seconds. The end of the mixing cycle time which is about 90 seconds in all is taken as time "zero" for purposes of observing the temperature. The mixture is then immediately poured into a 14×14×6 inch cardboard box having an open top. The thermocouple of the apparatus described above is inserted in the center of the box. To ensure contact with the mixture which is now a foaming liquid the thermocouple is centered into position in the box approximately 6 cm from the bottom. The apparatus then records the temperature differential with respect to time and the recorder graph traces the temperature differential curve which provides the data for determining the characteristics of the polyurethane foam process.

A number of polyurethane foam reactions were carried out in the manner described above with variations water, toluene, diisocyanate, stannous octoate, amine catalyst and polyol concentrations used to evaluate the effect of these quantity changes on the polyurethane foam process. These evaluations were made on the basis of the temperature differential with respect to time curve obtained on each of these reaction processes. A typical differential curve is illustrated in the attached drawing in which the X-coordinate represents process reaction time in seconds (t) and the Y-coordinate represents temperature (T) in degrees C. for the exotherm curve (curve 1) and the Y-coordinate represents degrees C. per second for the temperature differential curve (curve 2)

Two curves are shown in the drawing. Curve 1 shows the reaction temperature over the reaction period. The exothermic period continues over time period B and reaches a temperature height A. This temperature curve is based on information from the voltage signal provided from the thermocouple. The second curve 2 shows the temperature differential with respect to time (dT/dt) over the same reaction period. This curve has two differential peaks which demonstrates that there are two maxima in the rates of change in temperature increase throughout the reaction. These rates of change are assigned to the two exothermic reactions that take place sequentially in the polyurethane foam process. The maximum rates of temperature rise in the sequential reactions are C and $C^1$ respectively for the process illustrated. The time required to attain these maxima is shown as t1 and t2 respectively.

The effect of reaction component changes to the temperature differential with respect to time can be seen from the examples given below.

EXAMPLES 1-5

The effect of the water content in the polyurethane foam formulation were examined in the range of 2.0 to 6.0 parts by weight of water per 100 parts of polyol. The amount of toluene diisocyanate was adjusted to maintain an index of 105.

|  | Ex 1 | Ex 2 | Ex 3 | Ex 4 | Ex 5 |
|---|---|---|---|---|---|
| Polyol NIAX 16-46* in pbw | 100.0 | 100.0 | 100.0 | 100.0 | 100.0 |
| Water | 2.0 | 3.0 | 4.0 | 5.0 | 6.0 |
| NIAX A-1* Amine catalyst | 0.1 | 0.1 | 0.1 | 0.1 | 0.1 |
| Silicone surfactant Union Carbide L-6202* | 1.0 | 1.0 | 1.0 | 1.0 | 1.0 |
| Stannous Octoate | 0.25 | 0.25 | 0.25 | 0.25 | 0.25 |
| Toluene Diisocyanate | 28.3 | 38.4 | 48.6 | 58.8 | 68.9 |
| Max Temperature (T) in °C. | 104 | 125 | 142 | 152 | 159 |
| Time (t) to max Temp. in seconds | 253.2 | 180.8 | 138.0 | 127.5 | 116.4 |
| t1 in seconds | 19.5 | 30.0 | 25.5 | 28.2 | 22.1 |
| t2 in seconds | 151.5 | 86.2 | 76.5 | 77.5 | 74.4 |
| dT/dt1 | 0.72 | 1.04 | 1.27 | 1.37 | .46 |
| dT/dt2 | 0.28 | 0.71 | 1.10 | 1.37 | .60 |

*TM

In the above examples t1 is the time in seconds to attain the maximum temperature rise rate for the first sequential rise in the reaction and t2 is the time in seconds required to attain the maximum temperature rise rate for the second sequential rise. Maximum temperature attained within the foam increases with an increase in the water content of the formulation and that this increase occurs at an earlier time. The rates of temperature rise of the first exotherm also increases with the concentration of water while the time at which the maximum is attained is nearly constant. Similarly the rate of temperature rise of the second exotherm also increases with an increase in water concentration while the times at which the maxima occur are progressively shorter.

EXAMPLES 6-10

In this series of examples the amount of stannous octoate catalyst was varied to observe its effect on the overall polyurethane process.

|  | Ex 6 | Ex 7 | Ex 8 | Ex 9 | Ex 10 |
|---|---|---|---|---|---|
| Polyol NIAX 16-46* in pbw | 100.0 | 100.0 | 100.0 | 100.0 | 100.0 |
| Water | 4.0 | 4.0 | 4.0 | 4.0 | 4.0 |
| NIAX A-1* Amine Catalyst | 0.1 | 0.1 | 0.1 | 0.1 | 0.1 |
| Silicone surfactant Union Carbide L-6202* | 1.0 | 1.0 | 1.0 | 1.0 | 1.0 |
| Stannous octoate | 0.15 | 0.20 | 0.25 | 0.30 | 0.35 |
| Toluene diisocyanate | 48.6 | 48.6 | 48.6 | 48.6 | 48.6 |
| Max Temperature (T) in °C. | 133 | 138 | 141 | 146 | 147 |
| Time (t) to max temp. in seconds | 169.5 | 155.4 | 138.0 | 126.0 | 109.5 |
| t1 in seconds | 27.6 | 28.5 | 27.5 | 30.0 | 30.0 |
| t2 in seconds | 88.5 | 83.4 | 77.0 | 70.5 | 63.6 |
| dT/dt1 | 1.14 | 1.17 | 1.24 | 1.34 | .39 |
| dT/dt2 | 0.80 | 0.94 | 1.09 | 1.29 | .46 |

*TM

It can be seen from these examples that the maximum temperature attained within the foam increases with an increase in the concentration of the stannous octoate catalyst. The time at which the maximum temperature occurs is shortened. The position of the first maximum rate of temperature rise varies slightly while the maximum rate of temperature rise of the first exotherm increases with increased stannous octoate concentration. The second exotherm also follows an increase in the rate of temperature rise while the position of the maximum occurs at progressively shorter times with increased stannous octoate catalyst. The slopes of a curve of dT/dt1 and dT/dt2 versus the stannous octoate concentration are 1.34° and 3.34° C./sec pbw catalyst respectively. This indicates that the stannous octoate catalyst has a 2.5 fold effect on the rate of the second exotherm relative to the first exotherm.

EXAMPLES 11–16

In this series of examples the amount of amine catalyst was varied to observe its effect on the overall polyurethane process.

|  | Ex 11 | Ex 12 | Ex 13 | Ex 14 | Ex 15 | Ex 16 |
|---|---|---|---|---|---|---|
| Polyol NIAX 16-46* in pbw | 100.0 | 100.0 | 100.0 | 100.0 | 100.0 | 100.0 |
| Water | 4.0 | 4.0 | 4.0 | 4.0 | 4.0 | 4.0 |
| NIAX A-1* Amine Catalyst | 0.06 | 0.068 | 0.08 | 0.10 | 0.12 | 0.14 |
| Silicone surfactant Union Carbide L-6202* | 1.0 | 1.0 | 1.0 | 1.0 | 1.0 | 1.0 |
| Stannous octoate | 0.25 | 0.25 | 0.25 | 0.25 | 0.25 | 0.25 |
| Toluene diisocyanate | 48.6 | 48.6 | 48.6 | 48.6 | 48.6 | 48.6 |
| Max. Temperature (T) in °C. | 142 | 140 | 142 | 141 | 142 | 144 |
| Time (t) to max temp. in seconds | 156.0 | 145.5 | 151.5 | 138.0 | 138.0 | 120.6 |
| t1 in seconds | 28.5 | 30.0 | 31.5 | 27.5 | 27.0 | 26.4 |
| t2 in seconds | 81.0 | 87.0 | 81.0 | 77.0 | 69.0 | 66.0 |
| dT/dt1 | 1.13 | 1.12 | 1.16 | 1.24 | 1.33 | 1.38 |
| dT/dt2 | 1.02 | 1.00 | 1.05 | 1.09 | 1.16 | 1.27 |

*TM

It can be seen that although the maximum temperature attained within the foam does not vary appreciably, the maximum occurs at shorter time periods thus indicating a faster system with increased catalyst concentration. The maximum rate of temperature rise for the first exotherm increases with an increase in the amine catalyst concentration. The second exotherm also increases. The slopes of a curve of dT/dt1 and dT/dt2 versus the amine catalyst concentration are 3.46° and 3.16° C./sec pbw amine catalyst respectively. This indicates that the amine catalyst has a 10% greater effect on the exotherm corresponding to the first reaction of the sequence.

EXAMPLE 17

In this reaction the foam was prepared using an acetylated NIAX 16-46 TM and unlike the polyol of the previous reactions it no longer contained free hydroxyl groups.

| Acetylated polyol | 100.0 pbw |
|---|---|
| Water | 4.0 |
| NIAX A-1* Amine Catalyst | 0.1 |
| Silicone surfactant L-6202* | 1.0 |
| Stannous octoate | 0.25 |
| Toluene diisocyanate | 48.6 |
| Max Temperature (T) in °C. | 115 |
| Time (t) to max. temp. in seconds | 223.5 |
| t1 in seconds | 22.5 |
| t2 in seconds | — |
| dT/dt1 | 1.55 |
| dT/dt2 | — |

*TM

In this case the exotherm derivative trace presents only one maximum which occurs early in the reaction as compared to the first maxima observed in the other examples. This indicates that the reaction with the polyol-hydroxy groups is to be associated with the second exotherm peak.

EXAMPLE 18

Two polyols were compared in the same formulation. The first is NIAX Polyol 16-46 TM which is predominantly a secondary hydroxyl end-capped polether. The second is NIAX Polyol 12-48 TM which is predominantly primary hydroxyl end-capped polyether. Other physical parameters for the two polyols are comparable, both are trifunctional and have hydroxyl numbers of 47±1 mg KOH/g sample.

| Polyol NIAX 16-46* | 100.0 | — |
|---|---|---|
| Polyol NIAX 12-48* | — | 100.0 |
| Water | 4.0 | 4.0 |
| NIAX A-1* Amine Catalyst | 0.1 | 0.1 |
| Silicone surfactant L-6202* | 1.0 | 1.0 |
| Stannous octoate | 0.25 | 0.25 |
| Toluene diisocyanate | 48.6 | 48.6 |
| Max Temperature (T) in °C. | 140 | 143 |
| Time (t) to max temp. in seconds | 143.4 | 133.2 |
| t1 in seconds | 33.0 | 22.0 |
| t2 in seconds | 88.5 | 72.0 |
| dT/dt1 | 1.13 | 1.35 |
| dT/dt2 | 1.02 | 1.07 |

*TM

Thus the maximum temperature attained within the NIAX 12-48 TM polyol system is higher and occurs earlier. The values of the individual temperature rates of rise are both greater than those observed from the NIAX 16-46 TM polyol system. Both individual exotherms for the system containing NIAX 12-48 TM polyol also ocur at an earlier time. Thus, these values obtained for each of the parameters indicate that the formulation containing the NIAX 12-48 TM polyol is the faster, more reactive system.

The embodiments of the invention in which an exclusive property of privilege is claimed are defined as follows:

1. A method for determining the optimum component ratios in an exothermic process for producing polyurethane foam, which method comprises:
   (a) continuously measuring the temperature differential with respect to time in the reaction by means of an apparatus consisting of:
      (i) a means capable of generating a voltage signal proportional to the temperature in the reaction mixture,
      (ii) means capable of effecting a signal corresponding to the differential with respect to time of said voltage signal, (iii) means capable of recording the differential signal thereby producing a record of the temperature differential with respect to time; and (b) determining the said optimum component ratios by comparing the maximum value of each of the sequential temperature differential peaks recorded from said derivative signal and the times at which they occur.

2. A method as claimed in claim 1 wherein the polyurethane foam is blown using carbon dioxide generated from the reaction of water with an isocyanate.

3. A method as claimed in claim 1 wherein the polyurethane foam is blown using carbon dioxide generated from the reaction of water with an isocyanate and the vaporization of halogenated hydrocarbon.

4. A method as claimed in claim 1, 2 or 3 wherein said means capable of generating a voltage signal proportional to the temperature in the reaction mixture is a thermocouple.

5. A method as claimed in claim 1, 2 or 3 wherein said means capable of generating a voltage signal proportional to the temperature in the reaction mixture is a thermocouple and said means capable of effecting a signal corresponding to the derivative with respect to time of said voltage signal is an analog differentiating device.

6. A method as claimed in claim 1, 2 or 3 wherein said means capable of generating a voltage signal proportional to the temperature in the reaction mixture is a thermocouple and said means capable of effecting a signal corresponding to the derivative with respect to time of said voltage signal is a digital differentiating device.

* * * * *